(12) United States Patent
Gierucki

(10) Patent No.: US 7,730,657 B1
(45) Date of Patent: Jun. 8, 2010

(54) MONEY RETRIEVAL APPARATUS

(76) Inventor: Diane Gierucki, 9615 Silverlake Rd., Linden, MI (US) 48451

( * ) Notice: Subject to any disclaimer, the term of this patent is extended or adjusted under 35 U.S.C. 154(b) by 280 days.

(21) Appl. No.: 11/846,679

(22) Filed: Aug. 29, 2007

(51) Int. Cl.
*A01K 77/00* (2006.01)
(52) U.S. Cl. .......................................... 43/12; 294/19.1
(58) Field of Classification Search .................. 43/1, 43/7, 11, 12; 294/19.1–24, 66.1, 1.4, 1.5; 210/470, 471
See application file for complete search history.

(56) References Cited

U.S. PATENT DOCUMENTS

| | | | | |
|---|---|---|---|---|
| 2,683,949 | A * | 7/1954 | Berezansky | 43/12 |
| 2,739,403 | A * | 3/1956 | Kalmus | 43/12 |
| 5,581,929 | A * | 12/1996 | Molloy | 43/12 |
| 6,058,642 | A * | 5/2000 | Branneman | 43/12 |
| 2002/0011017 | A1* | 1/2002 | Blaschke | 43/12 |

* cited by examiner

*Primary Examiner*—Kimberly S Smith
*Assistant Examiner*—Joshua J Michener

(57) ABSTRACT

A retrieval apparatus. An illustrative embodiment of the retrieval apparatus includes a main shaft having a trigger compartment; a pair of net support arms pivotally carried by the main shaft; a collection net carried by the pair of net support arms; a pair of arm flanges pivotally attached to the pair of net support arms, respectively, and each other; a trigger block slidably mounted in the trigger compartment; a trigger extending from the trigger block; and a flange attachment cable connecting the trigger block and the pair of arm flanges.

5 Claims, 4 Drawing Sheets

US 7,730,657 B1

MONEY RETRIEVAL APPARATUS

FIELD

The present disclosure is generally directed to apparatus for retrieving objects. More particularly, the present invention relates to a retrieval apparatus which is suitable for retrieving money from fast-food customers at a fast-food restaurant drive-through window.

BACKGROUND

Fast-food restaurants typically have a drive-through window in which customers drive their car up to the window to pay for food after the food is ordered. Frequently, the cashier in the restaurant building and the customer must stretch their arms considerably when exchanging the fast food and payment. Therefore, a retrieval apparatus is needed which can be used to facilitate the secure exchange of fast food and/or payment between a customer and a fast food cashier.

SUMMARY

The present disclosure is generally directed to a retrieval apparatus. An illustrative embodiment of the retrieval apparatus includes a main shaft having a trigger compartment; a pair of net support arms pivotally carried by the main shaft; a collection net carried by the pair of net support arms; a pair of arm flanges pivotally attached to the pair of net support arms, respectively, and each other; a trigger block slidably mounted in the trigger compartment; a trigger extending from the trigger block; and a flange attachment cable connecting the trigger block and the pair of arm flanges.

BRIEF DESCRIPTION OF THE DRAWINGS

The disclosure will now be made, by way of example, with reference to the accompanying drawings, in which:

Referring initially to FIGS. 1-6 of the drawings, an illustrative embodiment of the retrieval apparatus is generally indicated by reference numeral 1. The retrieval apparatus 1 includes a generally elongated main shaft 2. As shown in FIGS. 3 and 5, a spring compartment 3 and an adjacent trigger compartment 4 are provided in the main shaft 2. A trigger slot 5 communicates with the trigger compartment 4. A generally curved or semicircular trigger guard 8 typically extends from the main shaft 2, over the trigger slot 5.

DETAILED DESCRIPTION

Figure 1:
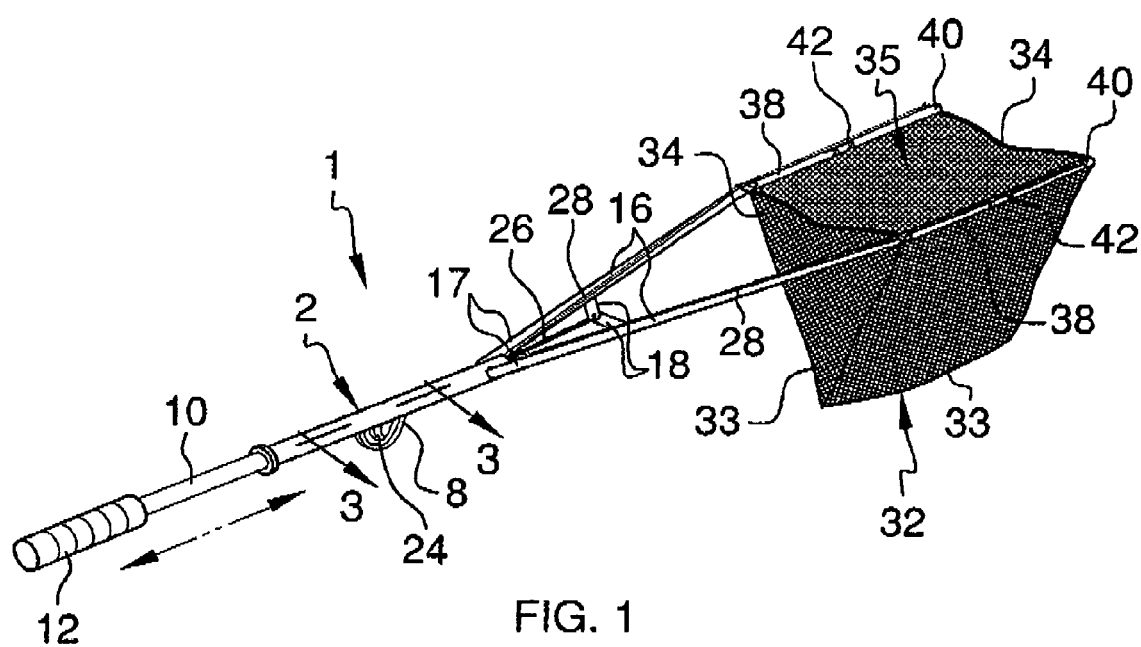
FIG. 1 is a perspective view of an illustrative embodiment of the retrieval apparatus, with a net element of the apparatus shown in an open configuration.
Figure 2:
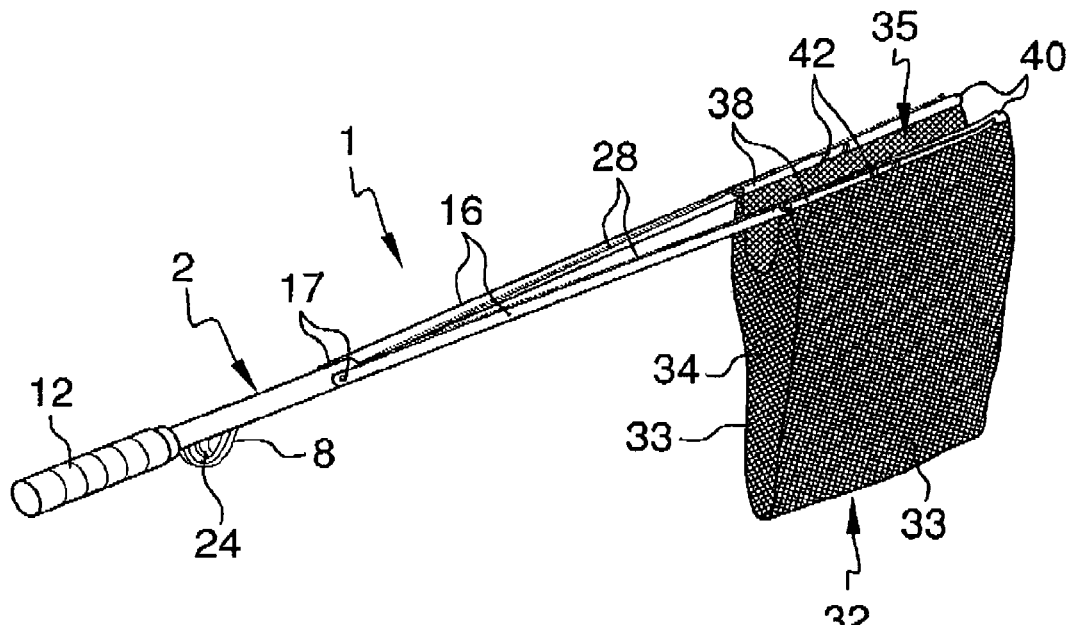
FIG. 2 is a perspective view of an illustrative embodiment of the retrieval apparatus, with a net element of the apparatus shown in a closed configuration.
Figure 3:
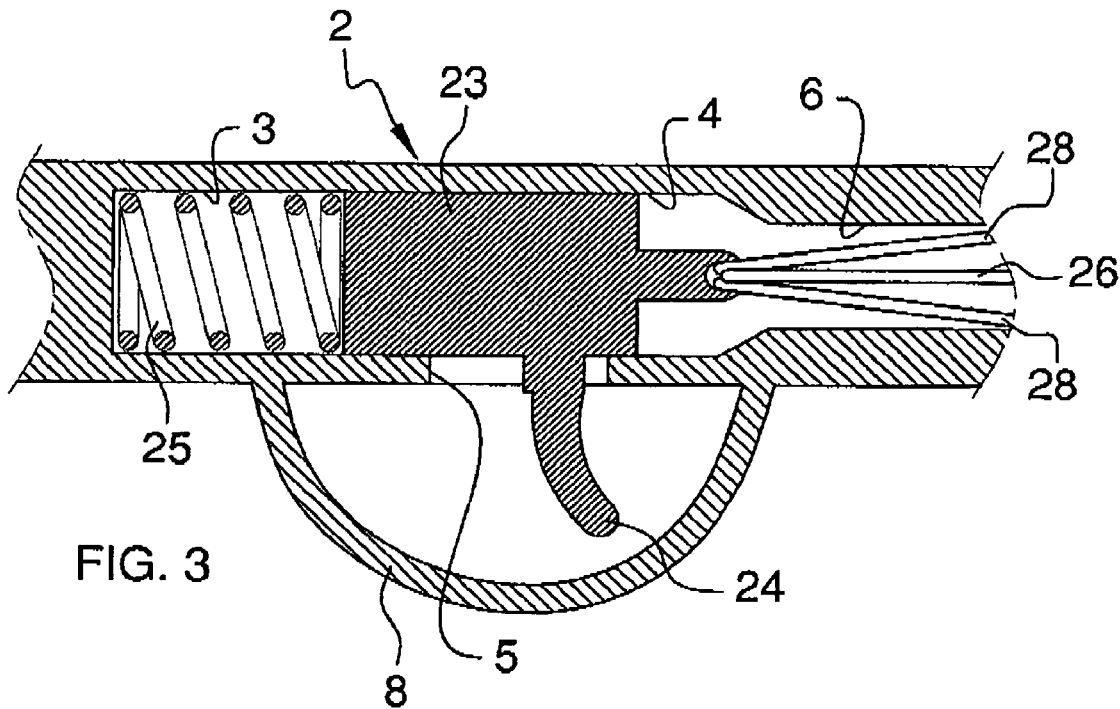
FIG. 3 is a cross-sectional view, taken along section lines 3-3 in FIG. 1, with a trigger element of an illustrative embodiment of the retrieval apparatus shown in a forward, net-opening configuration.
Figure 4:
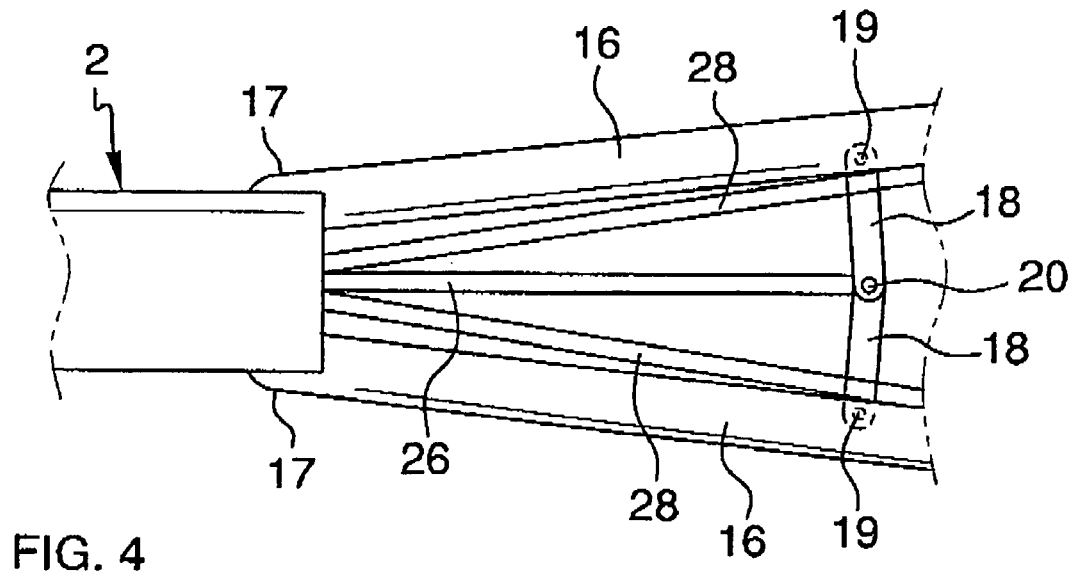
FIG. 4 is a top view, partially in section, of a main shaft element of an illustrative embodiment of the retrieval apparatus, with a pair of net support arms pivotally attached to the main shaft and multiple cables extending from the main shaft, more particularly illustrating a position of the net support arms when the net is in an open configuration.
Figure 5:
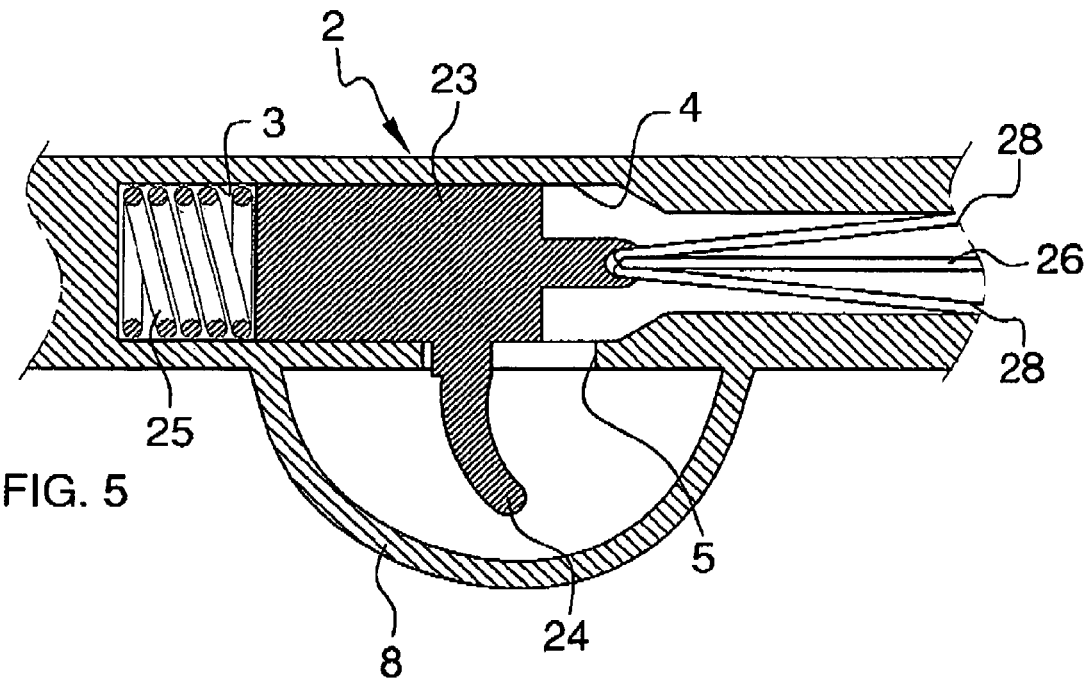
FIG. 5 is a cross-sectional view, taken along section lines 3-3 in FIG. 1, with the trigger element of an illustrative embodiment of the retrieval apparatus shown in a rearward, net-closing configuration.

Referring initially to FIGS. 1-6 of the drawings, an illustrative embodiment of the retrieval apparatus is generally indicated by reference numeral 1. The retrieval apparatus 1 includes a generally elongated main shaft 2. As shown in FIGS. 3 and 5, a spring compartment 3 and an adjacent trigger compartment 4 are provided in the main shaft 2. A trigger slot communicates with the trigger compartment 4. A generally curved or semicircular trigger guard 8 typically extends from the main shaft 2, over the trigger slot 5.

A handle 12 is typically provided on the main shaft 2. As shown in FIG. 1, in some embodiments a generally elongated handle shaft 10 is telescopically extendable from a first end of the main shaft 2. The handle 12 is provided on the handle shaft 10.

Figure 6:
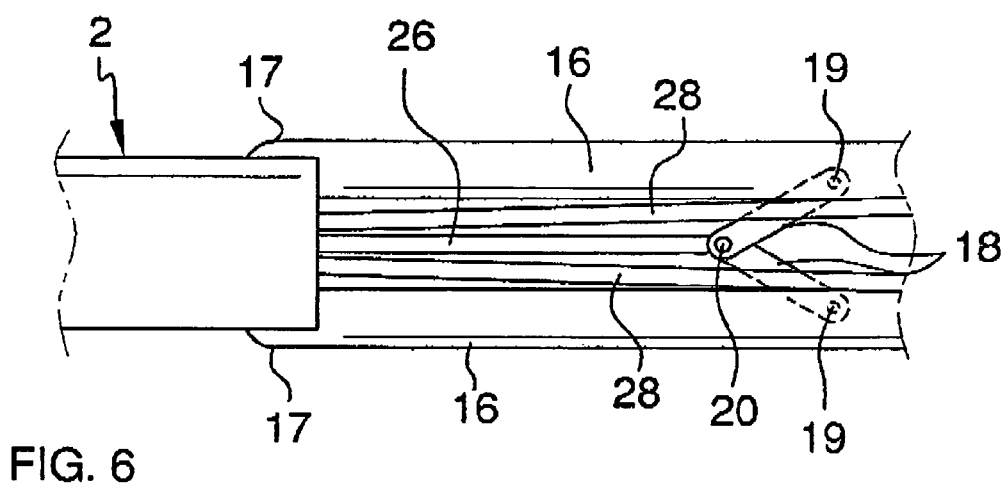
FIG. 6 is a top view, partially in section, of a main shaft element of an illustrative embodiment of the retrieval apparatus, with a pair of net support arms pivotally attached to the main shaft and multiple cables extending from the main shaft, more particularly illustrating a position of the net support arms when the net is in a closed configuration.

As shown in FIGS. 1-3, 4 and 6, a pair of generally elongated net support arms 16 is pivotally attached to the main shaft 2, generally at or adjacent to a second end thereof at a pivot point 17. As shown in FIGS. 4 and 6, an arm flange 18 is pivotally attached to each net support arm 16 at a pivot pin 19. The arm flanges 18 are pivotally attached to each other at a hinge pin 20. Accordingly, the net support arms 16 can be pivoted between the outwardly-extended configuration shown in FIG. 4, in which the arm flanges 18 are linearly extended with respect to each other between the net support arms 16, and the inwardly-extended configuration shown in FIG. 6, in which the arm flanges 18 are oriented at an angle with respect to each other and the net support arms 16 are generally parallel with respect to each other.

A collection net 32 is provided on the extending or distal ends of the net support arms 16. A net attachment arm 38 extends from each net support arm 16, with the net attachment arms 38 disposed in generally parallel relationship with respect to each other. A net folding arm 40 is pivotally attached to each corresponding net attachment arm 38 at an arm hinge 42. The collection net 32 includes a pair of net sides 33 each of which is attached to the corresponding net attachment arm 38 and net folding arm 40. A pair of net ends 34 attaches the respective ends of the net sides 33 to each other. The net sides 33 and net ends 34 define a net opening 35 of the collection net 32.

As further shown in FIGS. 3 and 5, a trigger block 23 is slidably mounted in the trigger compartment 4 of the main shaft 2. A trigger 24 extends from the trigger block 23, through the trigger slot 5. A trigger spring 25 is provided in the spring compartment 3 and normally biases the trigger block 23 in a forward position inside the trigger compartment 4, as shown in FIG. 3. The trigger 24 can be squeezed to relocate the trigger block 23 rearwardly in the trigger compartment 4, against the bias imparted by the trigger spring 25.

A first end of a flange attachment cable 26 is attached to the trigger block 23. The flange attachment cable 26 extends through a cable cavity 6 which communicates with the spring compartment 3 and extends from the main shaft 2. As shown in FIGS. 4 and 6, a second or distal end of the flange attachment cable 26 is attached to the hinge pin 20 which connects the arm flanges 18 to each other. Accordingly, upon squeezing of the trigger 24 and movement of the trigger block 23 against the trigger spring 25, the flange attachment cable 26 pulls the arm flanges 18 rearwardly, causing pivoting of the net support arms 16 from the outward position shown in FIG. 4 to the inward position shown in FIG. 6. This facilitates movement of the net sides 33 of the collection net 32 toward each other, from the extended position shown in FIG. 1 to the folded position shown in FIG. 2.

Figure 2A:
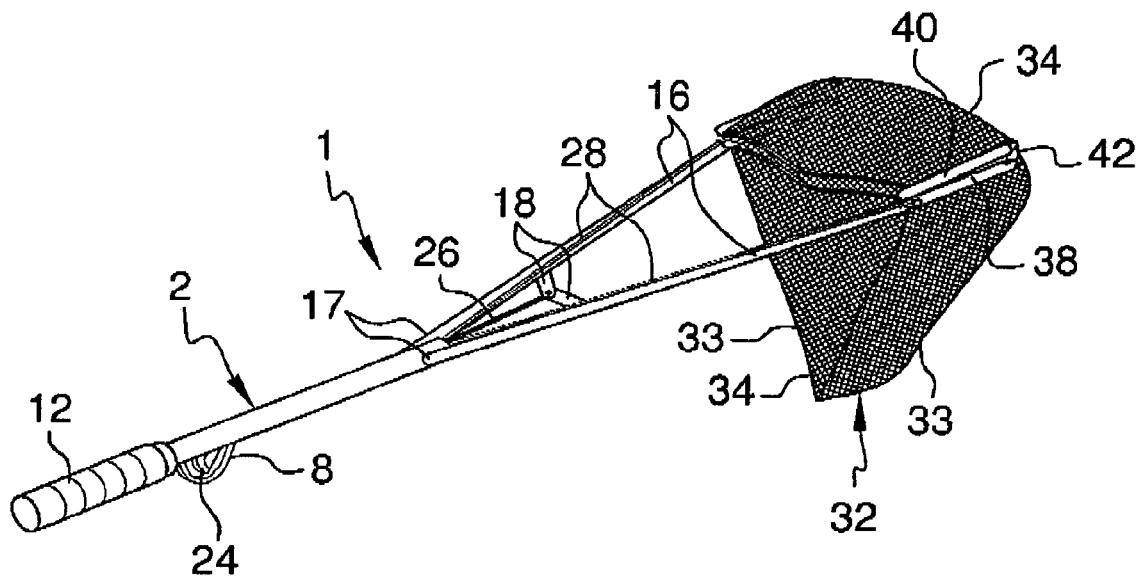
FIG. 2A is a perspective view of an illustrative embodiment of the retrieval apparatus, with a net element of the apparatus shown in a folded configuration.

As further shown in FIGS. 4 and 6, a pair of net attachment cables 28 extends from the trigger block 23, through the cable cavity 6 and along the respective net support arms 16. The net attachment cables 28 are attached to the respective net folding arms 40. Accordingly, upon squeezing of the trigger 24 and movement of the trigger block 23 against the trigger spring 25, the net attachment cables 26 pull and pivot the net folding arms 40 rearwardly on the respective net attachment arms 38 from the forwardly-extended position shown in FIG. 2 to the rearwardly-extended position shown in FIG. 2A. This facilitates lifting and folding of the distal or portion of the collection net 32 rearwardly onto the remaining front portion of the collection net 32, as shown in FIG. 2A.

In typical application, the retrieval apparatus 1 is used to retrieve payment (not shown) from a customer (not shown) in a vehicle at a fast food restaurant window. Accordingly, the trigger block 23 is initially disposed in the forward position shown in FIG. 3 and the collection net 32 deployed in the open configuration shown in FIG. 1. The cashier at the drive-through window grasps the handle 12 and extends the retrieval apparatus 1 toward the customer in the vehicle. The customer places the payment into the open net opening 35 of the collection net 32, after which the cashier pulls the trigger 24 to close and fold the collection net 32, as shown in FIGS. 2 and 2A. After the cashier has retrieved the closed collection net 32 back into the window, the trigger 24 is released. This facilitates deployment of the collection net 32 back to the open position shown in FIG. 1, after which the payment is retrieved from the collection net 32 through the net opening 35. The handle shaft 10 can be telescopically extended from the main shaft 2, as needed to lengthen the retrieval apparatus 1.

While the illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A retrieval apparatus, comprising:
    a main shaft having a trigger compartment;
    a pair of net support arms pivotally carried by said main shaft;
    a pair of net attachment arms carried by said pair of net support arms, respectively;
    a pair of net folding arms pivotally carried by said pair of net attachment arms, respectively;
    a collection net carried by said pair of net attachment arms and said pair of net folding arms;
    a pair of arm flanges pivotally attached to said pair of net support arms, respectively, and each other;
    a trigger block slidably mounted in said trigger compartment;
    a trigger extending from said trigger block;
    a flange attachment cable connecting said trigger block and said pair of arm flanges; and
    a pair of net attachment cables connecting said trigger block and said pair of net folding arms, respectively.

2. The retrieval apparatus of claim 1 wherein said collection net comprises a pair of net sides carried by said pair of net attachment arms, respectively, and said pair of net folding arms, respectively, and a pair of net ends carried by said pair of net sides.

3. The retrieval apparatus of claim 1 further comprising a spring compartment provided in said main shaft adjacent to said trigger compartment and a trigger spring provided in said spring compartment and engaging said trigger block.

4. The retrieval apparatus of claim 1 further comprising a handle carried by said main shaft.

5. The retrieval apparatus of claim 4 further comprising a handle shaft telescopically extendable from said main shaft and wherein said handle is carried by said handle shaft.

\* \* \* \* \*